United States Patent [19]

Shou et al.

[11] Patent Number: 5,862,070
[45] Date of Patent: Jan. 19, 1999

[54] DISCRETE COSINE TRANSFORMATION CIRCUIT

[75] Inventors: Guoliang Shou; Jie Chen; Chanming Zhou; Sunao Takatori, all of Tokyo, Japan

[73] Assignees: Yozan Inc., Tokyo; Sharp Kabushiki Kaisha, Osaka, both of Japan

[21] Appl. No.: 820,002

[22] Filed: Mar. 18, 1997

[30] Foreign Application Priority Data

Mar. 19, 1996 [JP] Japan ..................................... 8-088932

[51] Int. Cl.[6] .................. G06G 7/02; G06G 7/19
[52] U.S. Cl. .......................................... 364/826; 364/827
[58] Field of Search ..................... 364/826, 827, 364/807

[56] References Cited

U.S. PATENT DOCUMENTS

| | | |
|---|---|---|
| 4,156,284 | 5/1979 | Engeler . |
| 4,156,923 | 5/1979 | Lampe . |
| 4,161,785 | 7/1979 | Gasparek . |
| 5,166,896 | 11/1992 | Jeong et al. . |
| 5,187,680 | 2/1993 | Engeler .................................. 364/807 |

FOREIGN PATENT DOCUMENTS

| | | |
|---|---|---|
| 551 524 | 7/1993 | European Pat. Off. . |
| 90/16039 | 12/1990 | WIPO . |

OTHER PUBLICATIONS

P.R. Chang et al., "A High–Speed Neural Analog Circuit for Computing the Bit–Level Transform Image Coding", IEEE Transactions on Consumer Electronics, vol. 37, No. 3, Aug. 1991, pp. 337–342.

K. Moon et al., "Proceedings of the Custom Integrated Circuits Conference", Institute of Electrical and Electronics Engineers, May 1990, pp. 2671–2674.

W.E. Engeler et al., "Matrix Multipliers for Calculating Orthogonal Transforms", IEEE International Conference on Solid State Circuits, Feb. 1979, pp. 72–73.

*Primary Examiner*—Tan V. Mai
*Attorney, Agent, or Firm*—Pillsbury Madison & Sutro LLP

[57] ABSTRACT

A high-speed discrete cosine transformation circuit includes the one-dimensional input signals x(0) to x(7) being input in parallel to the positive input terminals "+" or the negative input terminals "−" of eight neural operation units (NOU) 11 to 18 through capacitors d0 to d6. In each NOU 11 to 18, input signals x(0) to x(7) are added and subtracted. Input signals x(0) to x(7) are multiplied beforehand by the coefficient in proportion to the capacities of capacitors d0 to d6 which are connected to NOU 11 to 18. Thereafter, discrete cosine transforming coefficients y(0) to y(7) are output. A two-dimensional discrete cosine transformation circuit is realized by using the one-dimensional discrete cosine transforming circuit.

4 Claims, 5 Drawing Sheets

DISCRETE COSINE TRANSFORMATION CIRCUIT

FIELD OF THE INVENTION

The present invention relates to a discrete cosine transformation circuit (DCT circuit).

BACKGROUND OF THE INVENTION

Discrete cosine transformation (DCT) is one kind of orthogonal transformation. It is a signal processing method used more widely now that multimedia processing has developed recently. Discrete cosine transformations like JPEG and MPEG are used with increasing importance, especially in the field of image processing. DCT is usually implemented by digital circuits or software.

SUMMARY OF THE INVENTION

When DCT is executed by software, high-speed processing is difficult, although proprietary hardware is not required. When proprietary hardware is used, high-speed processing is possible, but only with extra hardware requiring many multiplication circuits and addresses. Moreover the quantity of hardware is large in many cases an analog input signal must be converted to a digital one.

An object of the present invention is to provide a discrete cosine transformation circuit for high-speed discrete cosine transformation with less required hardware and with an analog input signal.

To achieve the foregoing object, the linear discrete cosine transformation circuit of the present invention includes: I) N number of signal input means for receiving N points of analog input signals, and II) N number of operation units. Each operational unit comprises i) a first and second inverting amplifiers; ii) first, second and third capacitors, each having a capacity corresponding to the coefficients for a discrete cosine transformation, two positive and negative input terminals and an output terminal. With the first capacitor is provided between an input and output of the first inverting amplifier. The second capacitor is provided between an output of the first inverting amplifier and an input of the second inverting amplifier. The third capacitor is provided between an input and an output of the second inverting amplifier. Each operational unit further comprises: iii) two positive and negative input terminals connected to an input of the first and second inverting amplifier in the operation unit, respectively; and iv) an output terminal.

The secondary discrete cosine transformation circuit of the present invention includes N number of linear discrete cosine transformation circuits. Each of the N circuits receives as input N number of rows or columns of signals in parallel, as mentioned above, and N number of those to each of which is input in parallel the outputs corresponding to the identical rows or columns of the inputs of said N number of linear discrete cosine transformation circuits.

Another secondary cosine transformation circuit of the present invention includes the above-mentioned first discrete cosine transformation circuit for receiving N number of rows or columns of signals in parallel, a secondary memory device for storing outputs of the above first discrete cosine transformation circuit on each row, and a second linear discrete cosine transformation circuit for receiving the signals read out by each column from the secondary memory device.

Another secondary discrete cosine transformation circuit of the present invention includes: i) a first switching circuit having first and second input terminals, each receiving N number of input signals, and a first switching circuit having an output terminal for outputting N number of output signals; ii) a one-dimensional discrete cosine transformation circuit with an input connected to an output terminal of the first switching circuit, iii) a second switching circuit having an input terminal to connect with an output of the one-dimensional discrete cosine transformation circuit as well as first and second output terminals, each able to output N number of signals; and iv) a two-dimensional memory means for storing signals input from the first output terminal of the second switching circuit to each row, wherein N number of rows or columns of signal sources are connected to the first input terminal of the first switching circuit, and signals read out by column from the two-dimensional memory means are connected to the second input terminal of the first switching circuit.

PREFERRED EMBODIMENT OF THE PRESENT INVENTION

Figure 1A:
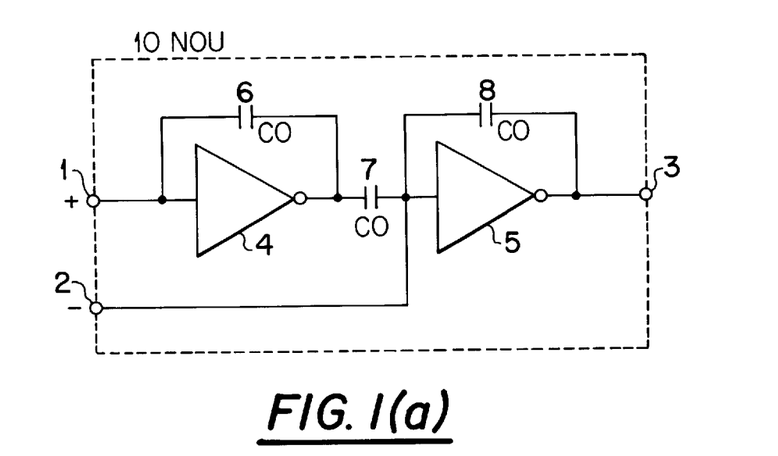
FIG. 1(a) and 1(b) illustrate the neural operation units used in the present invention.

FIG. 1 (a) shows the structure of neural operation unit (NOU) 10 used in the discrete cosine transformation circuit of the present invention. The (NOU) 10 includes input terminals 1 and 2 for receiving analog voltage signals, an output terminal 3, inverting amplifiers 4 and 5, and capacitors 7 and 8 having identical capacities, with the capacity of each assumed to be C0. The input of inverting amplifier 4 is connected to input terminal 1, and the output of inverting amplifier 4 is connected to an input of inverting amplifier 5 through capacitor 7. Input terminal 2 is connected to the input of inverting amplifier 5, its output being connected to output terminal 3. Capacitor 6 is provided between the input and output of inverting amplifier 4, and capacitor 8 is provided between the input and output of inverting amplifier 5. Inverting amplifiers 4 and 5 include CMOS inverters connected in series by an odd number of stages and other components.

Figure 1B:
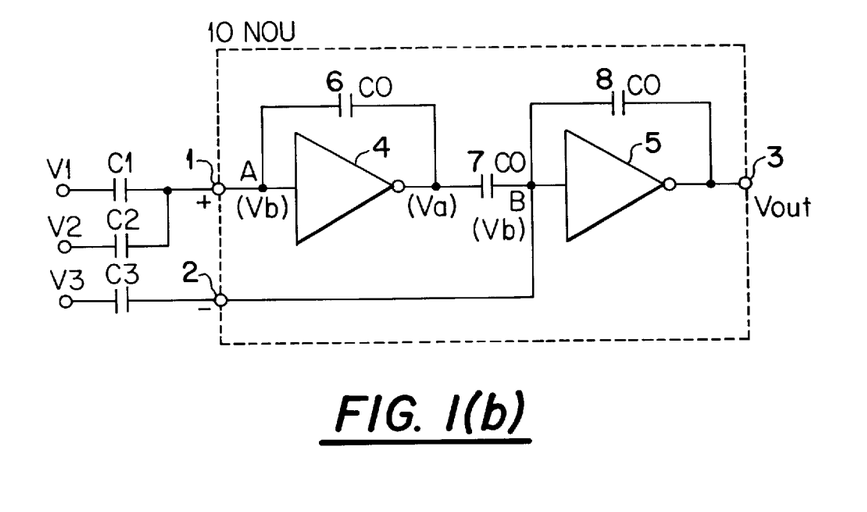

The operation of neural operation unit 10 having the above structure is described with reference to FIG. 1 (b), which shows neural operation unit 10 with three input voltages V1, V2, V3 applied thereto. Voltages V1 and V2 are applied to input terminal 1 through capacitors C1 and C2, respectively, and voltage V3 is applied to input terminal 2 through capacitor C3.

Point A on the input of inverting amplifier 4 is connected to the capacitors C0, C1 and C2, and to n-type MOSFET and p-type MOSFET gate electrodes which are included in the first-stage CMOS inverter of inverting amplifier 4. Points A and B are floating. If all the electric charges stored in capacitors 6, 7, 8, C1, C2 and C3 are 0, the total quantity stored in the capacitors is 0 based on the principle of conservation of charge with reference to points A and B, even when input voltages V1, V2 and V3 are applied. Consequently, the expressions regarding the conservation of charge (1) and (2) at points A and B, respectively, are as follows.

$$C1(V1-Vb)+C2(V2-Vb)+C0(Va-Vb)=0 \quad (1)$$

$$C0(Va-Vb)-C3(V3-Vb)-C0(Vout-Vb)=0 \quad (2)$$

Here, Vb is the electric potential on points A and B, and Va is the electric potential of the output of inverting amplifier 4. The electric potential Vb of points A and B is usually set to be ½ of the supply voltage applied to inverting amplifiers 4 and 5. When inverting amplifiers 4 and 5 are driven by +Vdd and the ground potential, the Vb is +(1/2)Vdd, and when inverting amplifiers 4 and 5 are driven by positive and negative supply voltages, respectively, it is 0 volts.

Expression (3) can be derived from formulas (1) and (2).

$$C1(V1-Vb)+C2(V2-Vb)-C3(V3-Vb)-C0(Vout-Vb)=0 \quad (3)$$

When the electric potentials in expression (3) correspond to the potentials on reference Vb as V(1)=V1−Vb, V(2)=V2−Vb, V(3)=V3−Vb, Vo=Vout−Vb, expression (3) can be rewritten by formula (4):

$$Vo = \frac{C1}{C0} V(1) + \frac{C2}{C0} V(2) - \frac{C3}{C0} V(3) \quad (4)$$

Expression (4) indicates that V(1) and V(2) input to input terminal 1 are added, and V(3) input to input terminal 2 is subtracted. Input voltages V(1), V(2) and V(3) are output after being multiplied by the values corresponding to the ratios of C0 provided in neural operation unit 10 and the respectively connected capacitors C1, C2 and C3.

The operations above are performed at an extremely high speed in a time span approximately equal to the delay time from the input to output of inverting amplifiers 4 and 5. The circuit of NOU is realized as an integrated circuit of a semiconductor. Determining the capacities of the capacitances according to conductor areas makes them remarkably accurate thereby enabling accurate operational results. Since its voltage alone drives the neural operation unit, electric power consumption is quite low.

The discrete cosine transformation circuit of the present invention uses the above neural operation unit as its operation unit. Next, the one-dimensional discrete cosine transformation circuit of the first embodiment of the present invention is described.

The one-dimensional discrete cosine transformation on point N of the first dimensional signal x(k) is defined by expression (5):

$$y(n) = \sqrt{\frac{2}{N}} \; C(n) \sum_{k=0}^{N-1} x(k) \cos \frac{(2k+1)n\pi}{2N} \quad (5)$$

$$n = 0, 1, \ldots, N-1$$

$$C(n) = \begin{cases} \frac{1}{\sqrt{2}}, & n=0 \\ 1, & n \neq 0 \end{cases}$$

When it is assumed that C(m,k)=cos(kπ/m) through one cycle of operation, formula (5) can be simplified into formula (6). This is the example when N=8.

$$y(0) = \frac{1}{2\sqrt{2}} \sum_{k=0}^{7} x(k) \quad (6)$$

$$y(1) = \quad (7)$$

$$\frac{1}{2} \{x(0)C(16,1) + x(1)C(16,3) + x(2)C(16,5) + x(3)C(16,7) -$$

$$x(4)C(16,7) - x(5)C(16,5) - x(6)C(16,3) - x(7)C(16,1)\}$$

$$y(2) = \quad (8)$$

$$\frac{1}{2} \{x(0)C(8,1) + x(1)C(8,3) - x(2)C(8,3) - x(3)C(8,1) -$$

$$x(4)C(8,1) - x(5)C(8,3) - x(6)C(8,3) + x(7)C(8,1)\}$$

$$y(3) = \quad (9)$$

$$\frac{1}{2} \{x(0)C(16,3) - x(1)C(16,7) - x(2)C(16,1) - x(3)C(16,5) +$$

$$x(4)C(16,5) + x(5)C(16,1) + x(6)C(16,7) - x(7)C(16,3)\}$$

$$y(4) = \quad (10)$$

$$\frac{1}{2\sqrt{2}} \{x(0) - x(1) - x(2) + x(3) + x(4) - x(5) - x(6) + x(7)$$

$$y(5) = \quad (11)$$

$$\frac{1}{2} \{x(0)C(16,5) - x(1)C(16,1) + x(2)C(16,7) + x(3)C(16,3) -$$

$$x(4)C(16,3) - x(5)C(16,7) + x(6)C(16,1) - x(7)C(16,5)\}$$

$$y(6) = \quad (12)$$

$$\frac{1}{2} \{x(0)C(8,3) - x(1)C(8,1) + x(2)C(8,1) - x(3)C(8,3) -$$

$$x(4)C(8,3) + x(5)C(8,1) - x(6)C(8,1) + x(7)C(8,3)\}$$

$$y(7) = \quad (13)$$

$$\frac{1}{2} \{x(0)C(16,7) - x(1)C(16,5) + x(2)C(16,3) - x(3)C(16,1) +$$

$$x(4)C(16,1) - x(5)C(16,3) + x(6)C(16,5) - x(7)C(16,7)\}$$

Figure 2:
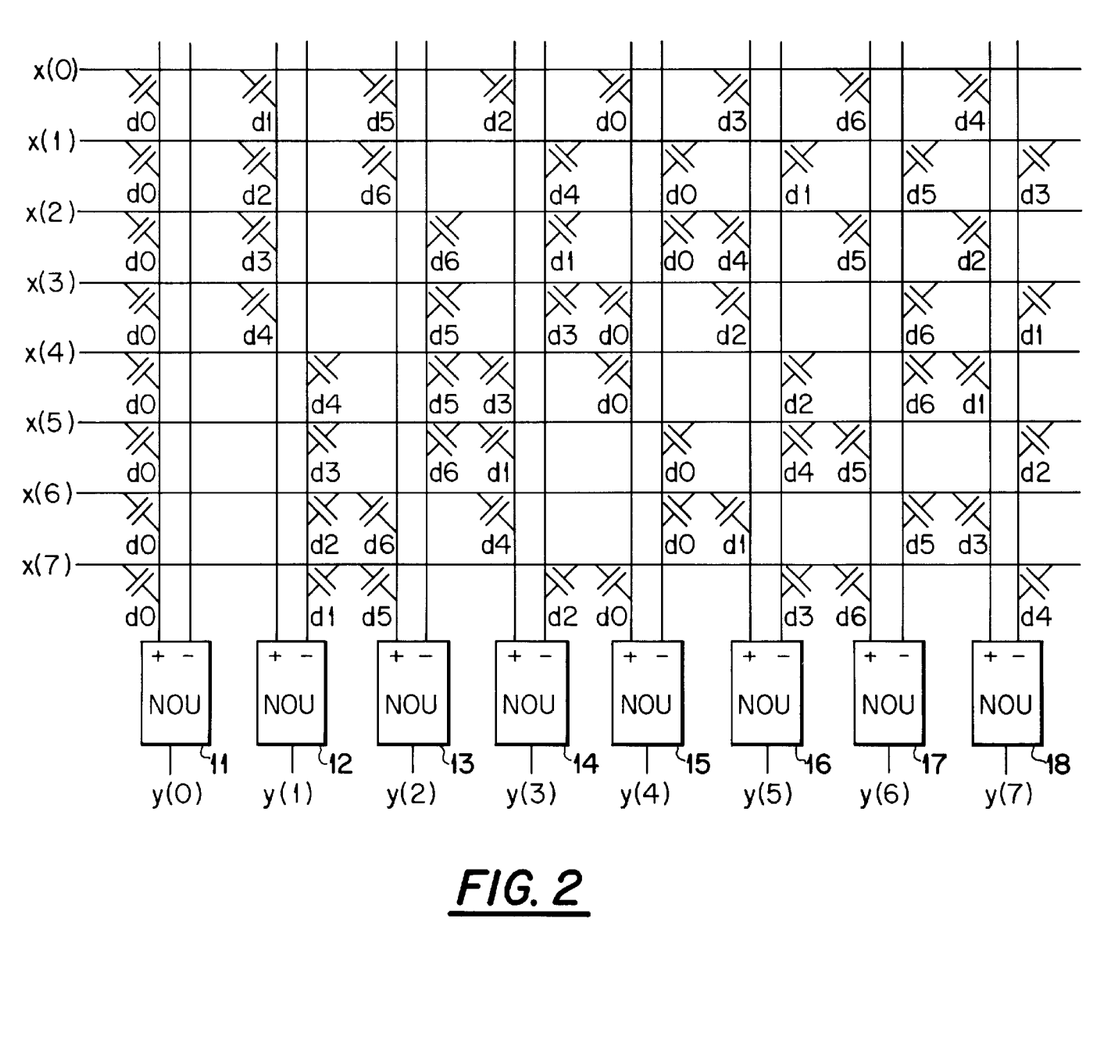
FIG. 2 illustrates a one-dimensional discrete cosine transformation circuit in accordance with the first embodiment of the present invention.

Using the neural operation unit described above, the one-dimensional discrete cosine transformation circuit of the first embodiment performs the operations in expressions (6) to (13) in parallel. FIG. 2 shows the structure of the one-dimensional discrete cosine transformation circuit on eight points of N. In illustrated FIG. 2 the circuit includes the neural operation units 11 to 18 mentioned above. Capacitors d0 to d6, and one-dimensional input signals x(0) to x(7). As shown, matrices are formed by the wiring connections to the one-dimensional input signals x(0) to x(7), and to positive input terminals "+" and negative input terminals "−" of neural operation units 11 to 18. Capacitors d0 to d6 are connected to the cross points of the wiring. The "+" and "−" correspond to input terminals 1 and 2 in FIG. 1.

Capacitors d0 to d6 are formed so as to possess the capacities in expressions (14) to (20) when the capacity of the capacitors in neural operation units 11 to 18 is C0:

$$d0 = \frac{1}{2\sqrt{2}} C0 \quad (14)$$

$$d1 = \frac{C(16,1)}{2} C0 = \frac{\cos(\pi/16)}{2} C0 \quad (15)$$

$$d2 = \frac{C(16,3)}{2} C0 = \frac{\cos(3\pi/16)}{2} C0 \quad (16)$$

$$d3 = \frac{C(16, 5)}{2} C0 = \frac{\cos(5\pi/16)}{2} C0 \qquad (17)$$

$$d4 = \frac{C(16, 7)}{2} C0 = \frac{\cos(7\pi/16)}{2} C0 \qquad (18)$$

$$d5 = \frac{C(8, 1)}{2} C0 = \frac{\cos(\pi/8)}{2} C0 \qquad (19)$$

$$d6 = \frac{C(8, 3)}{2} C0 = \frac{\cos(3\pi/8)}{2} C0 \qquad (20)$$

In this structure, the one-dimensional input signals x(0) to x(7) are input in parallel to the positive input terminals "+" and the negative input terminals "−" of eight neural operation units (NOU) 11 to 18 through capacitors d0 to d6 connected to the cross points of the matrices. In each NOU 11 to 18, input signals x(0) to x(7) are added and subtracted. Input signals x(0) to x(7) are multiplied beforehand by the coefficient determined by capacities of capacitors d0 to d6 which are connected to NOU 11 to 18. Thereafter, discrete cosine transforming coefficients y(0) to y(7) are output.

All input signals x(0) to x(7) are input to the positive input terminal of NOU 11 through capacitor d0. The operation in expression (6) above is performed in NOU 11.

Similarly, the operations noted by expressions (7) to (13) are performed in NOU 12 to 18, respectively, and then discrete cosine transforming coefficients y(1) to y(7) are output from NOU 12 to 18, respectively.

The discrete cosine transformation on eight points is performed by the structure in FIG. 2. Any number of points on the first dimensional discrete cosine transformation circuit can be defined; it is not limited to eight.

N number of points of discrete cosine transformation can be performed in parallel in N number of neural operation circuits by the one-dimensional discrete cosine transformation circuit of the present invention. Each neural operation circuit has an operation time approximately identical to the propagation delay time of the inverting amplifier mentioned above. This enables high-speed operation of the one-dimensional discrete cosine transformation. Since each neural operation unit includes two inverting amplifiers as mentioned above and each unit usually includes three steps of CMOS inverters, the one-dimensional discrete cosine transformation circuit can be realized with only 48 CMOS inverters and 88 capacitors. Consequently, the quantity of required hardware is small.

A two-dimensional discrete cosine transformation circuit in accordance with a second embodiment of the present invention is described below.

The two-dimensional discrete cosine transformation is defined by expression (21):

$$y(u, v) = \frac{2}{N} C(u)C(v) \sum_{i=0}^{N-1} \sum_{j=0}^{N-1} x(i, j) \cos \frac{(2i+1)u\pi}{2N} \cos \frac{(2j+1)v\pi}{2N} \qquad (21)$$

The two-dimensional discrete cosine transformation can be decomposed into the operation of the one-dimensional discrete cosine transformation independent of the variables i and j. First, the one-dimensional discrete cosine transformation is performed with respect to i(j) as shown in expression (22) and then with respect to j(i) as shown in expression (23):

$$t(u, j) = \sqrt{\frac{2}{N}} C(u) \sum_{i=0}^{N-1} x(i, j) \cos \frac{(2i+1)u\pi}{2N} \qquad (22)$$

$$y(u, v) = \sqrt{\frac{2}{N}} C(v) \sum_{j=0}^{N-1} t(u, j) \cos \frac{(2j+1)v\pi}{2N} \qquad (23)$$

These two operations reduce the number of operations.

Figure 3:
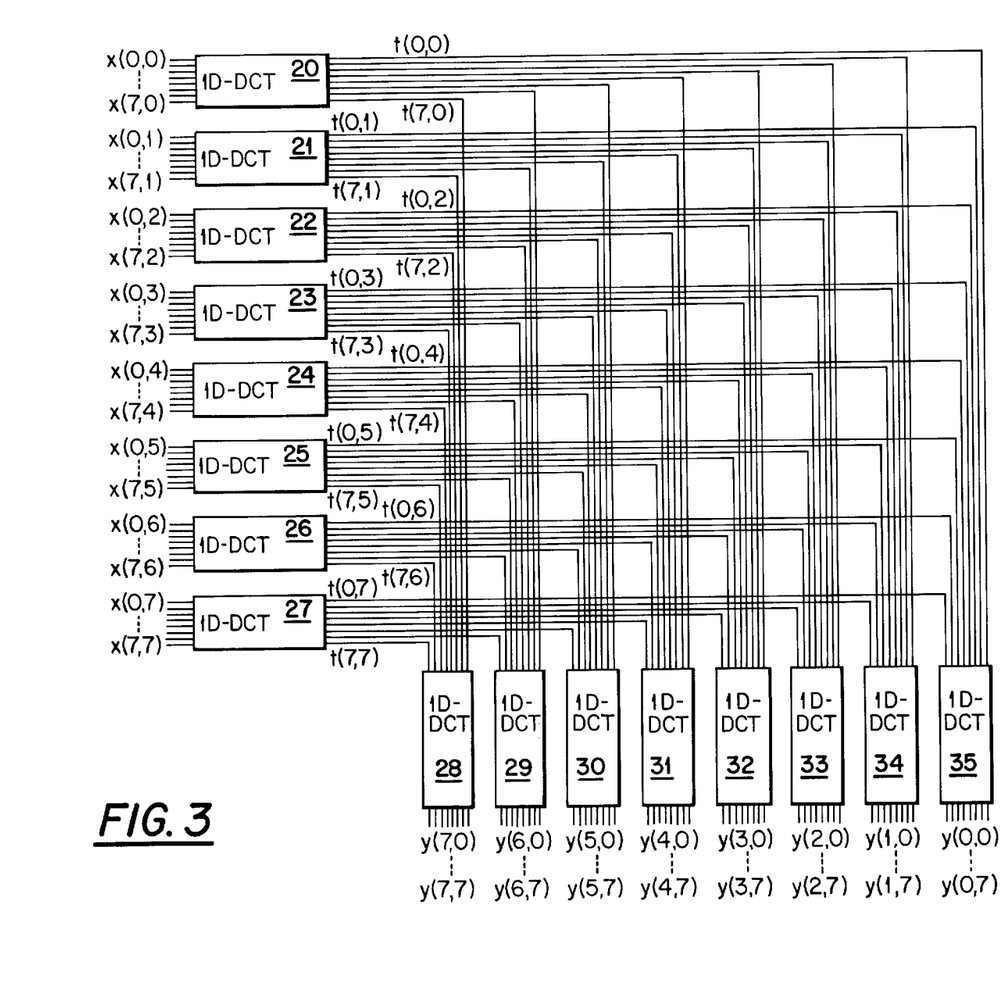
FIG. 3 illustrates a two-dimensional discrete cosine transformation circuit in accordance with the second embodiment of the present invention.

FIG. 3 shows the structure of the two-dimensional discrete cosine transformation circuit of the second embodiment. The circuit performs two dimensional discrete cosine transformations on 8 rows×8 columns of data. As illustrated in FIG. 3, the circuit includes the one-dimensional discrete transformation circuits 20 to 35 shown in FIG. 2. High-speed two-dimensional discrete cosine transformations can be performed by eight first discrete cosine transformation circuits 20 to 27 performing one-dimensional cosine transformations in column direction, and by the other eight first discrete cosine transformation circuits 28 to 35 doing such transformations in the row-direction.

Eight inputs from x(0,0) to x(7,0), x(0,1) to x(7,1), . . . x(0,7) to x(7,7) are input to one-dimensional discrete cosine transformation circuits 20 to 27, respectively, and one-dimensional discrete cosine transformation is performed in each circuit. Then, first dimensional discrete cosine transforming coefficients t(0,0) to t(7,0), t(0,1) to t(7,1), . . . , t(0,7) to t(7,7) are output from circuits 20 to 27, respectively. Thereafter, coefficients belonging to the identical row of one-dimensional discrete cosine transforming coefficients t(0,0) to t(7,7) are input to one-dimensional discrete cosine transformation circuits 28 to 35 in such manner that coefficients t(7,0) to t(7,7) are input to first discrete cosine transformation circuit 28, and coefficients t(6,0) to t(6,7) are input to circuit 29.

Figure 4:
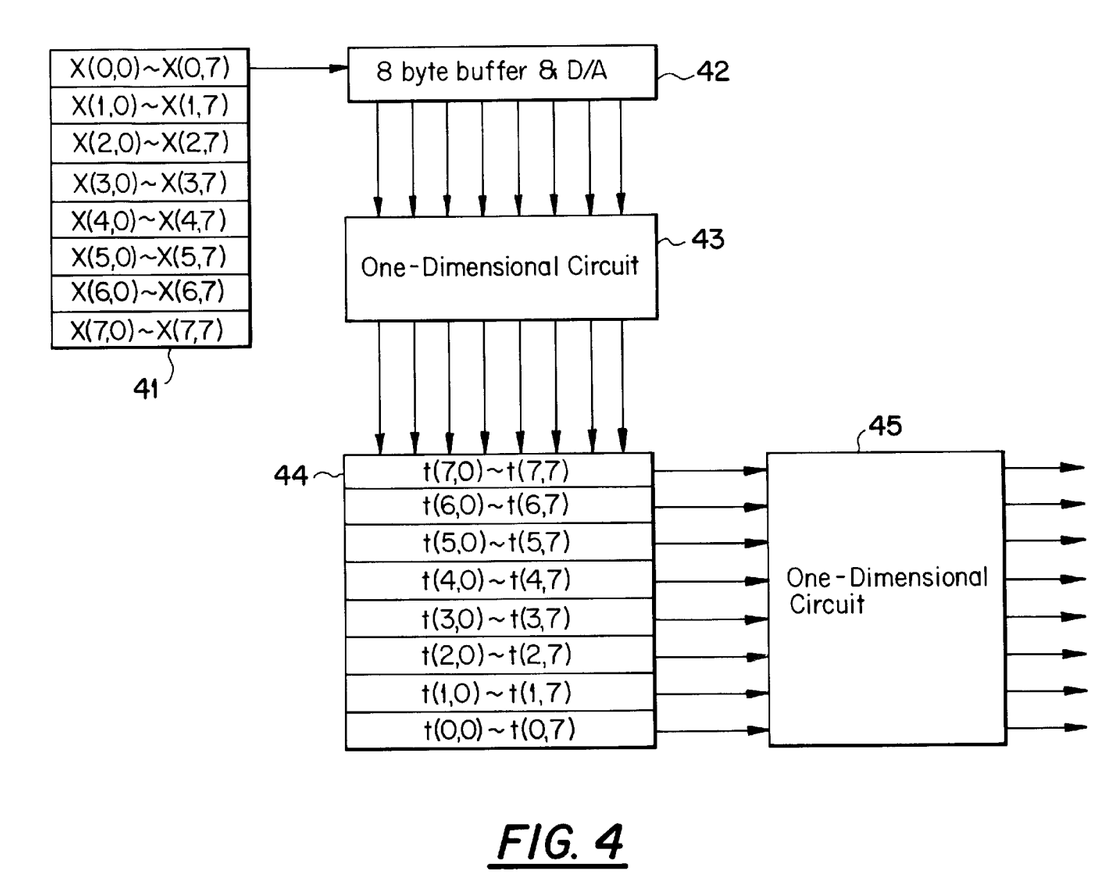
FIG. 4 illustrates a variation of the two-dimensional discrete cosine transformation circuit in accordance with the present invention.

FIG. 4 illustrates a buffer and D/A converting circuit 43 for inputting one row of image data in sequence in such manner as to read data from x(0,0) to x(0,7) first. x(1,0) to x(1,7) second, and successively on to x(7,0) to x(7,7), converting the data from digital to analog and outputting it to one-dimensional cosine transformation circuit 43. One-dimensional discrete cosine transformation circuit 43 performs a discrete cosine transformation on the one-row image data converted into analog data input from the buffer and D/A converting circuit 42. Its structure is similar to that in FIG. 2. An analog memory 44 stores output from one-dimensional discrete cosine transformation circuit 43, including, for example, a two-dimensional analog shift register. An one-dimensional discrete cosine transformation circuit reads in the column direction the one-dimensional discrete cosine coefficients stored in analog memory 44 and performs one-dimensional discrete cosine transformation. It has the same structure as that in FIG. 2.

In the two-dimensional DCT circuit having the above structure, data x(0,0) to x(0,7) on the 0-order row in the 8×8 8-bit digital image data stored in digital memory 41 is read out into the buffer and D/A converting circuit 42, and each is then converted into an analog voltage signal. The image data signal of one row converted into the analog voltage signal in the buffer and D/A converting circuit 42 is supplied in parallel to one-dimensional DCT circuit 43, which then performs in parallel the one-dimensional dimensional discrete cosine transformation. The conversion result outputs t(0,0) to t(0,7) are written in analog memory 44.

Digital image data of the first row x(1,0) to x(1,7) stored in digital memory 41 is input to the buffer and D/A converting circuit 42, the one-dimensional discrete cosine conversion is performed in DCT circuit 43, and results t(1,0) to t(1,7) are stored in analog memory 44. Similarly, digital image data in digital memory 41 are successively input to the buffer and D/A converting circuit 42 row by row, and the one-dimensional discrete cosine conversion is performed in one-dimensional DCT circuit 43. The results are successively stored in analog memory 44, and the results after performing the row by row one-dimensional discrete cosine conversions are stored in analog memory 44, as shown in FIG. 4.

Data stored in analog memory 44 is read out column by column in column direction and supplied to one-dimensional DCT circuit 45. That is, 0-order column data t(0,0) to t(0,7) among the data in analog memory 44 is read out and supplied to one-dimensional DCT circuit 45 and the first degree discrete cosine transformation performed. The DCT circuit 45 performs the first discrete cosine transformation in column direction, and two-dimensional discrete cosine conversion coefficients from y(0,0) to y(0,7) are output from first degree DCT circuit 45.

First column data from t(1,0) to t(1,7) is read out from analog memory 44 and the one-dimension cosine conversion performed in one-dimension DCT circuit 45. The two-dimensional discrete cosine conversion coefficients from y(1,0) to y(1,7) are next output from the outputs of one-dimensional DCT circuit 45. Similarly, data in the column direction is read out and processed successively in one-dimensional DCT circuit 45. Results of the two-dimensional discrete cosine conversions are then successively output from the outputs of one-dimensional DCT circuit 45.

Though the time required for the two-dimensional discrete cosine conversion increases, the quantity of required hardware in this embodiment is small.

Figure 5:
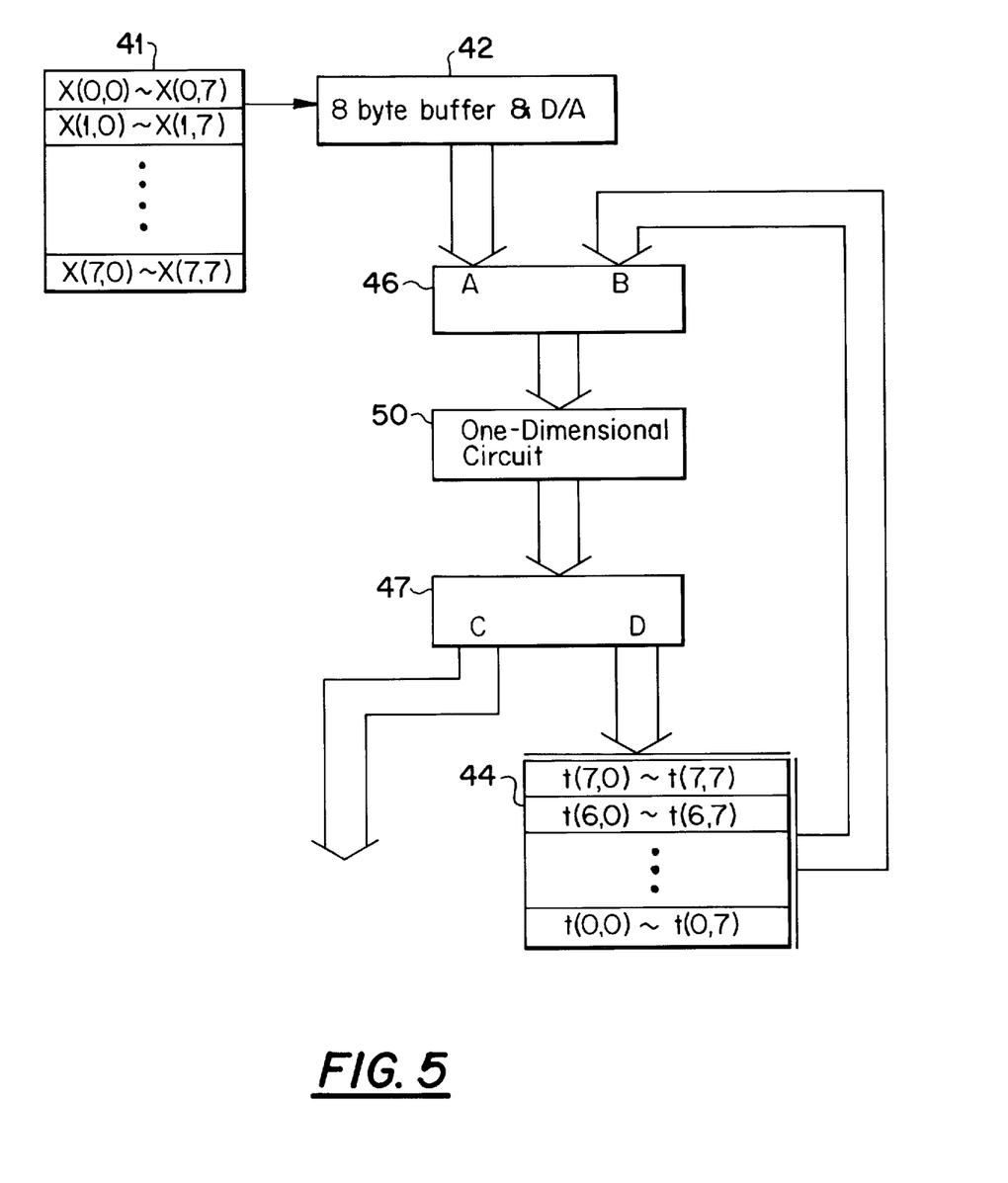
FIG. 5 illustrates another embodiment of the two-dimensional discrete cosine transformation circuit in accordance with the present invention.

FIG. 5 shows an embodiment with less hardware than that of the embodiment in FIG. 4. The quantity of the hardware of the embodiment is smaller by switching using a single one-dimensional DCT circuit from input to output and from output to input. The structure is formed because one-dimensional DCT circuits 43 and 45 do not work at the same time in FIG. 4.

As illustrated in FIG. 5, the digital memory 41, buffer and D/A converting circuit and analog memory 44 are identical to those in FIG. 4. The one-dimensional DCT circuit 50 is exactly like that in FIG. 2, and switching circuits 46 and 47 are provided for switching the input and the output, respectively, for this DCT circuit 50.

In the two-dimensional DCT circuit with the above structure, switching circuit 46 is initially set so that data from side A is output and switching circuit 47 so that the supplied data is output to side D. In this configuration, similar to that in FIG. 4, image data stored in digital memory 41 is sequentially read out by one row into the buffer and D/A converting circuit 42, and the signal, now converted into analog, is applied to one-dimensional circuit 50 through switching circuit 46. The output signal, having had the one-dimensional DCT circuit 50, is output from side D of switching circuit 47 and sequentially stored in analog memory 44.

After completing the one-dimensional discrete cosine conversion with respect to the 8×8 image data in digital memory 41, the resulting data undergoes the one-dimensional discrete cosine conversion in analog memory 44 and is stored there in row direction. Then, the signal read out from analog memory 44 is switched so as to be input to one-dimensional DCT circuit 50 by switching circuit 46 to side B, and simultaneously, the output of one-dimensional DCT circuit 50 is switched so as to be output to the outside by switching circuit 47 to side C.

As above, after setting switching circuits 46 and 47, data is read out column by column from analog memory 44, input to one-dimensional DCT circuit 50 through switching circuit 46 and the one-dimensional discrete cosine conversion performed in column direction. The resulting signal of the two-dimensional discrete cosine conversion is output in sequence from one-dimensional DCT circuit 50 through an output terminal of switching circuit 47. This embodiment decreases the amount of needed hardware.

The discrete cosine transformation circuit of the present invention enables high-speed one- and two-dimensional discrete cosine conversions with minimal hardware.

What is claimed is:

1. A one-dimensional discrete cosine transformation circuit for generating an output of discrete transformation from N (wherein N is a positive integer) number of input voltage terminals for respectively receiving N input voltages comprising:

N number of operational units each of which comprises:
   i) a positive input terminal;
   ii) a negative input terminal;
   iii) an output terminal;
   iv) a first inverting amplifier having an input and an output, said input of the first inverting amplifier being connected to said positive input terminal;
   v) a first feedback capacitance connected between said input and said output of said first inverting amplifier;
   vi) an intermediate capacitance having an input and an output;
   vii) said input of the intermediate capacitance being connected to said output of said first inverting amplifier;
   viii) a second inverting amplifier having an input and an output, said input of the second inverting amplifier being connected to said output of said intermediate capacitance and to said negative input terminal, said output of the second inverting amplifier being connected to said output terminal, and
   ix) a second feedback capacitance connected between said input and said output of said second inverting amplifier; and N number of capacitances corresponding to said input voltages each of which is connected between one of said input voltage terminals and one of said positive and negative input terminals and respectively having capacities according to coefficients of said discrete cosine transformation.

2. A two-dimensional discrete cosine transformation circuit for performing two-dimensional discrete cosine transformation on N rows×N columns of data points, comprising:

i) a first set of N number of one-dimensional discrete cosine transformation circuits as claimed in claim 1, each receiving signals from a row or column in parallel, and
   ii) a second set of N number of one-dimensional discrete cosine transformation circuits as claimed in claim 1, each receiving output from said first set of N number of one-dimensional discrete cosine transformation circuits corresponding to the identical row or column.

3. A two-dimensional discrete cosine transformation circuit for performing two-dimensional discrete cosine transformation on N rows×N columns of data points, comprising:

i) a first one-dimensional cosine transformation circuit as claimed in claim 1, for receiving signals from a row or column in parallel;
   ii) a two-dimensional memory means for storing in each row of said two-dimensional memory means an output of said first one-dimensional discrete cosine transformation circuit; and iii) a second one-dimensional discrete cosine transformation circuit as claimed in claim 1 for receiving signals read out by row from said two-dimensional memory means.

4. A two-dimensional cosine transformation circuit for performing two-dimensional discrete cosine transformation on N rows×N columns of data points, comprising:

i) a first switching circuit having first and second input terminals, each terminal receiving N number of input signals, and said first switching circuit also having an output terminal for outputting N number of output signals;

ii) a one-dimensional discrete cosine transforming circuit as claimed in claim 1 having an input connected to said output terminal of said first switching circuit;

iii) a second switching circuit having an input terminal connected with an output of said one-dimensional discrete cosine transformation circuit, and having first and second output terminals each with the ability to output N number of signals; and iv) a two-dimensional memory means for storing signals input from said first output terminal of said second switching circuit in each column of said two-dimensional memory means;

wherein N number of rows or columns of signals are applied to said first input terminal of said first switching circuit, and signals read out by column from said two-dimensional memory means are applied to said second input terminal of said first switching circuit.

* * * * *